United States Patent
Ataka et al.

[15] 3,635,142
[45] Jan. 18, 1972

[54] EXCHANGE LENS WITH THE LENS-SHUTTER

[72] Inventors: Takeshi Ataka, Sumiyoshi-ku; Shohei Tenkumo; Minoru Sekita, both of Sakai-shi; Yuji Nakaniwa, Tokyo, all of Japan

[73] Assignee: Minolta Camera Kabushiki Kaisha, Osaka, Japan

[22] Filed: Apr. 4, 1969

[21] Appl. No.: 813,622

[30] Foreign Application Priority Data

Apr. 10, 1968 Japan..................................43/23803

[52] U.S. Cl................................................95/53 E, 95/12.5
[51] Int. Cl. ...........................................................G03b 9/62
[58] Field of Search..................................95/12.5, 53, 55, 57

[56] References Cited

UNITED STATES PATENTS

| | | | |
|---|---|---|---|
| 1,782,860 | 11/1930 | Reipert | 95/12.5 |
| 2,282,291 | 5/1942 | Whitman | 95/53 |
| 2,708,395 | 5/1955 | Wagner et al. | 95/53 X |
| 2,926,581 | 3/1960 | Gebele | 95/53 |

*Primary Examiner*—Joseph F. Peters, Jr.
*Assistant Examiner*—Michael L. Gellner
*Attorney*—Watson, Cole, Grindle & Watson

[57] ABSTRACT

A control circuit sets the lens shutter in action in response to the opening action of a focal plane shutter and closes the focal plane shutter after the lens shutter is closed, so that the proper exposure function of the lens shutter is maintained when the focal plane shutter is opened or closed.

3 Claims, 4 Drawing Figures

3,635,142

INVENTORS,
TAKESHI ATAKA
SHOHEI TENKUMO
MINORU SEKITA
YUJI NAKANIWA
BY Watson, Cole, Grindle & Watson
ATTORNEYS

EXCHANGE LENS WITH THE LENS-SHUTTER

BACKGROUND OF THE INVENTION

Generally, a camera with a focal plane shutter has the advantage that the lens can be exchanged easily, but the shutter speed cannot be made faster than 1/60 to 1/125 sec. with an electronic flash of short flash duration. However, a stroboscopic flash and a high-shutter speed is desired when photographing a comparatively bright object in rapid motion or when photographing an object in bright light, making use of the illumination from the electronic flash as a subsidiary light source. Also, even when no flash is used, the focal plane shutter has the disadvantage that the pictured image is distorted when photographing an object in rapid motion. On the other hand, it is known that the lens shutter, though it has the advantage that the image is not distorted at any shutter speed, has the disadvantage that, when an exchange lens is to be used, all the exchange lenses have to be provided with a shutter and they become expensive.

SUMMARY OF THE INVENTION

The invention eliminates the aforementioned disadvantages by combining the focal plane shutter with the lens shutter and by making use of the advantage of each shutter according to various photographic requirements. To explain in more detail, when the stroboscopic flash must be synchronized with a high-shutter speed of a focal plane shutter in the camera body, or, when an object in rapid motion is to be photographed, an exchange lens having a lens shutter is used and the lens shutter is electrically controlled and set in motion while the focal plane shutter is fully open so that the exposure time is controlled by the lens shutter. For ordinary photography an exchange shutter without a lens shutter is used and the exposure time is then controlled by the focal plane shutter in the camera body. Further the present invention provides exposure control of the lens shutter by closing a control circuit including the power source and the electromagnet for operating the lens shutter in response to the opening action of the focal plane shutter, and additionally, a maintenance switch is provided in parallel with the control circuit, which closes when the lens shutter is opened and opens when the lens shutter is closed, so that the lens shutter operates correctly. The closing of the focal plane shutter begins after the closing of the lens shutter by making the focal plane shutter electrically controlled by the closing of the lens shutter.

A first object of the invention is to provide a circuit for controlling the operation of a focal plane shutter and a lens shutter.

A second object is to provide a control circuit for activating the lens shutter in response to the opening of the focal plane shutter and for closing the focal plane shutter subsequent to the closing of the lens shutter.

A third object is to provide an improved electronic control circuit for operating the focal plane and lens shutters of a camera, which circuit may be used with a number of different camera exchange lenses.

DESCRIPTION OF THE PREFERRED EMBODIMENT

Figure 1:
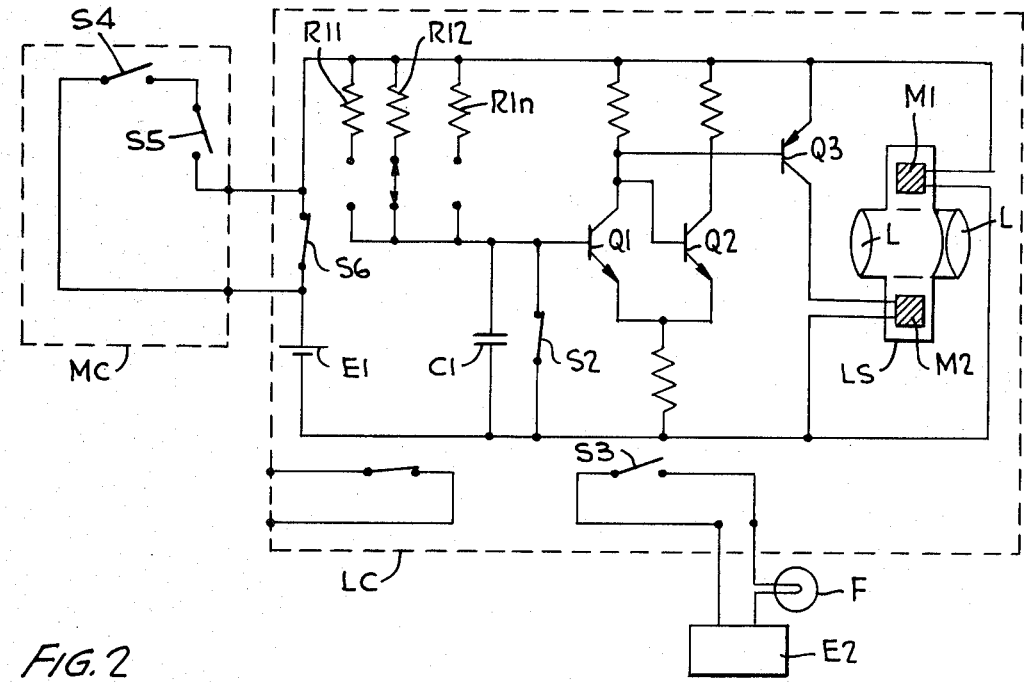
FIG. 1 shows the circuit of the preferred embodiment of the present invention wherein the electric circuit of the lens shutter is controlled by the mechanically controlled focal plane shutter.

The first preferred embodiment shown in FIG. 1, comprises control circuit LC for controlling the lens shutter, of which L is the lens and LS is the lens shutter of the lens. The electromagnet $M_1$, starts the opening action of the lens shutter and the electromagnet $M_2$, starts the closing action of the lens shutter. The exposure time setting resistors $R_{11}$, $R_{12}$..., $R_{1n}$, which are to be chosen alternatively by the switch $S_1$, constitute a series circuit together with the power source $E_1$ and the condenser $C_1$, thus forming a RC delay circuit. The plus terminal of condenser $C_1$ is connected with the base of the first transistor $Q_1$ having a collector terminal connected with the bases of the second and third transistors $Q_2$ and $Q_3$, within the collector circuit of the third transistor $Q_3$ is connected the closing electromagnet $M_2$ in parallel with the opening electromagnet $M_1$. In parallel with the condenser $C_1$ is formed a short circuit by the timing switch $S_2$ which is opened in connection with the opening action of the lens shutter LS.

F is an electronic flash which constitutes a series circuit together with the power source $E_2$ and the flash trigger switch $S_3$ which is closed in connection with the opening action of the lens shutter.

The connecting circuit MC comprises $S_4$, $S_5$. In the camera $S_4$ is the main switch which is operated in connection with the shutter release button on the camera body and is closed when the release button is depressed, and $S_5$ is closed in connection with the action of the focal plane shutter and it can be replaced by, for example, a synchroconnection point of the focal plane shutter. The time during which the lens shutter is opened, after the switch $S_5$ is closed and the flash trigger switch $S_3$ is closed, must be equal to or larger than the period of time after the closing of the switch $S_5$ when the focal plane shutter is fully open.

Figure 4:
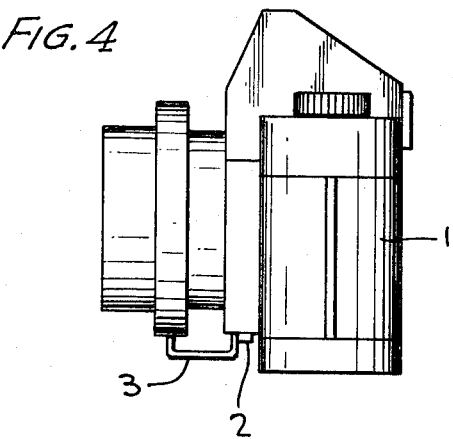
FIG. 4 is a side view of a camera illustrating the electrical connection between the camera and the exchange lens.

The exchange lens and the camera body may be connected by a bayonet-type connector or a screw-type connector, but the present invention requires the connection of the terminals of the lens and the camera body. For this purpose, as is shown in FIG. 4 for example, a terminal 2 may be mounted on the camera 1 to be connected with the connection wire 3 of the lens, but it is also possible to form an electrical contact on the connector of the lens and the camera body.

The maintenance switch $S_6$ helps maintain the normal function of the electric control circuit for the lens shutter until the lens shutter is closed even if the switch $S_4$ or switch $S_5$ should be accidentally opened while the lens shutters is in action, and this maintenance switch is so constructed that it is closed when the lens shutter is open and is opened when the lens shutter is closed.

FIG. 1 shows the state of the circuit when the focal plane shutter is activated. The speed of the focal plane shutter is set in advance at a sufficiently slow speed. The lens shutter, on the other hand, is set at the desired speed by choosing one of the resistors $R_{11}$ to $R_{1n}$ by means of $S_1$.

Then, as the release button of the camera is depressed the main switch $S_4$ is closed first, then the switch $S_5$ is closed in response to the opening action of the focal plane shutter and the opening electromagnet $M_1$ is activated so that and the lens shutter begins its opening motion. When the condenser $C_1$ is charged up to a certain voltage through the shutter speed setting resistor $R_{12}$ in the Figure, the first transistor $Q_1$ that has been cut off is switched on and therefore the second transistor $Q_2$ is from on to off and the third transistor $Q_3$ is switched from off to on. The closing electromagnet $M_2$ is magnetized and the closing motion of the lens shutter is begun. In the meantime the flash trigger switch $S_3$ is closed, flashing the electronic flash, and after the lens shutter is closed the focal plane shutter that has been set in advance at a low-shutter speed closes, thus completing the operation of the circuit.

Even if the main switch $S_4$ or the switch $S_5$ should be opened, during the process of photography described above, by a too early release, for example, of the release button, the control circuit works in the normal way because the maintenance switch $S_6$ is closed wherein the lens shutter is open and the exposure control operated as described above.

Figure 2:
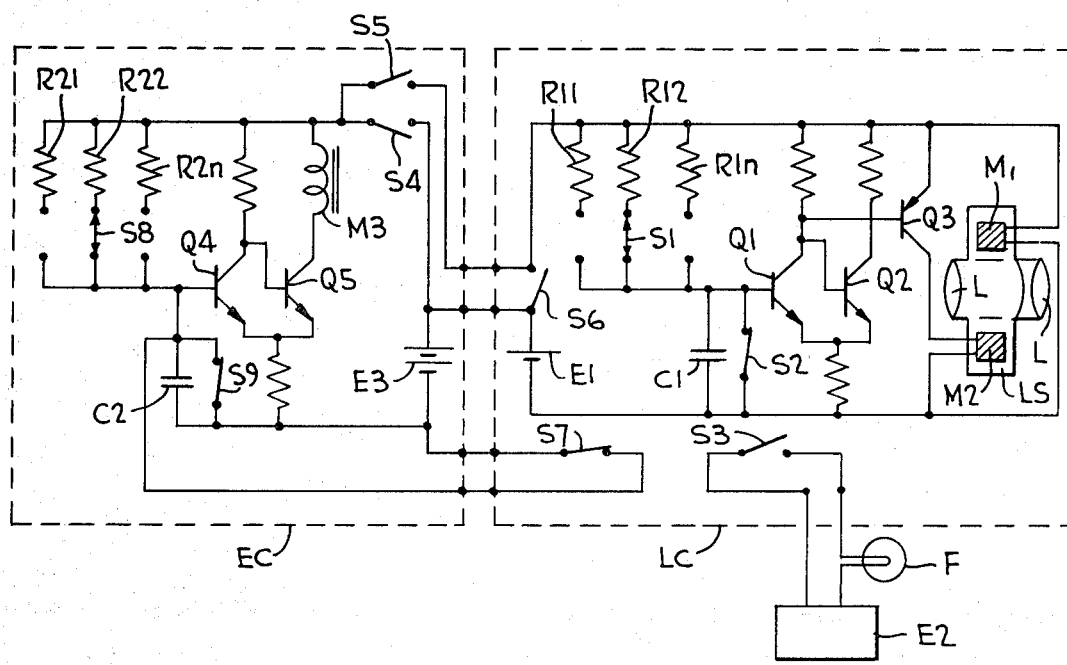
FIG. 2 shows the circuit of the second preferred embodiment of the present invention with which the lens shutter is electrically controlled by the electrically controlled focal plane shutter.

With the second preferred embodiment shown in FIG. 2, the focal plane shutter is controlled electrically and the control circuit Ec is electrically connected, with the electric circuit LC for the lens shutter of the exchange lens. And FIG. 2 shows the state when the two shutters are activated.

As is evident from the Figure, the electric control circuit for the lens shutter is identically the same as the one shown in FIG. 1. The control circuit for the focal plane shutter has the power source $E_3$, switching setting resistors $R_{21}$, $R_{22}$... $R_{2n}$, the switch $S_8$ and the timing condenser $C_2$ which is connected in with the short-circuit switch $S_9$. The plus terminal of the condenser $C_2$ is connected to the base of the first transistor $Q_4$, whose collector terminal is connected with the base of the second transistor $Q_5$, having a collector circuit connected to electromagnet $M_3$ which, when it is demagnetized, starts the closing process of the focal plane shutter. And in this respect the present invention does not differ from known conventional electrically controlled focal plane shutters.

In parallel with short-circuit switch $S_9$, of the condenser $C_2$, is a circuit which is connected with the terminals of the camera body, and between the terminals of the exchange lens connected safety switch $S_7$, which is opened when the closing of the lens shutter is completed and is closed while the lens shutter is open. And it short circuits the condenser $C_2$ until the closing action of the lens shutter is completed and starts the charging of the condenser $C_2$ after the closing of the lens shutter is completed. Therefore, with an exchange lens not having a lens shutter, the safety switch $S_7$ is not set and the charging and discharging of the condenser $C_2$ is switched and controlled by the opening and closing of the short-circuit switch $S_9$.

With the second preferred embodiment having the construction as described above, when the release button on the camera body is activated, the main switch $S_4$ in the Ec circuit of the camera body is closed first and with it the focal plane shutter is disengaged and begins to operate, and thus the shutter is opened. Short-circuit switch $S_9$ of the focal plane shutter control circuit is opened, but because the safety switch $S_7$ has been closed by the lens shutter opening the condenser $C_2$ is short-circuited and it does not begin to charge because the current flows through the set resistor ($R_{22}$ in the Figure and switches $S_9$ and $S_7$). Also the switch $S_5$ is closed by including the focal plane shutter and the circuit of the power source $E_1$ of the lens shutter control circuit Lc is closed and electromagnet $M_1$ is instantly magnetized to start the opening action of the lens shutter. The maintenance switch $S_6$ is closed by the opening action of the lens shutter so that the function of the circuit is maintained. In connection with the opening action of the lens shutter, the timing switch $S_2$ is opened and the condenser $C_1$ begins to be charged by the current flowing through the set resistor ($R_{12}$ in the Figure). And when the condenser $C_1$ is charged to a certain voltage the transistor $Q_1$ that has been cut off is switched on and consequently the transistor $Q_2$ is switched off and the transistor $Q_3$ is switched on, so that electromagnet $M_2$ is activated and the lens shutter begins its closing action. In the meantime the flash trigger switch $S_3$ is closed and the electronic flash operates while the lens shutter is open. Even if the switches $S_4$, $S_5$ should be accidentally opened, the control circuit functions normally because the maintenance switch $S_6$ is closed. When the lens shutter is closed completely the safety switch $S_7$ is opened and then the condenser $C_2$ begins to be charged, and when it is charged to a certain voltage the transistor $Q_4$ is switched on and consequently the transistor $Q_5$ is cut off and the electromagnet $M_3$ is deactivated and the focal plane shutter is closed.

The safety switch $S_7$ that has been described above is not necessarily needed, if the exposure time of the focal plane shutter is set sufficiently longer than that of the lens shutter so that the lens shutter functions while the focal plane shutter is fully open. But by providing the safety switch $S_7$ it is unnecessary to consider the interrelationship between the exposure times of the two shutters and the focal plane shutter can always be set at the shortest exposure time.

Figure 3:
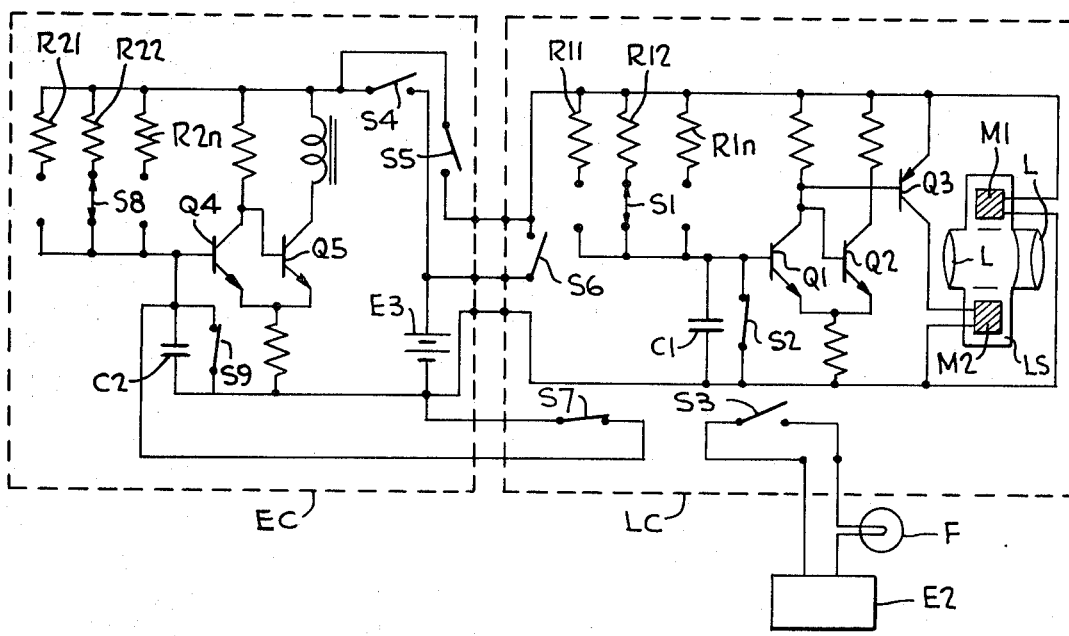
FIG. 3 shows a modification of the second preferred embodiment and wherein the power source of the control circuit for the focal plane shutter is also used as the power source of the control circuit for the lens shutter.

The third preferred embodiment of the present invention shown in FIG. 3 is the same as the second preferred embodiment except that the power source $E_3$ of the focal plane shutter control circuit is also used as the power source $E_1$ (of the second preferred embodiment) of the lens shutter control circuit.

Now, the present invention is not limited to the preferred embodiments described above, but, for example, it is also possible that instead of the shutter speed setting resistors $R_{11}$, $R_{12}$...$R_{1n}$ and the switch $S_1$ of the lens shutter control circuit some photoconductive element may be used which measures the brightness of the subject or the flash intensity and controls the closing action of the lens shutter. And it is also possible that the starting of the opening action of the lens shutter is electrically controlled and thereafter the action of the lens shutter is mechanically operated by a known mechanical lens shutter mechanism. Further, an application is also possible wherein the lens shutter is provided with a focal plane shutter with which an exchange lens is not used ordinarily. And still further it is also possible that the same means as the one of the present invention may be used for single-lens reflex camera having a lens shutter with which an opening-and-closing plate or a mirror is used instead of the focal plane shutter to serve as the screen in front of the film.

What is claimed is:

1. Apparatus for controlling a camera focal plane shutter and a lens shutter, comprising:

a lens shutter mechanism and a focal plane shutter mechanism;

an actuating switch closed upon the opening of said focal plane shutter, and means for opening and closing said lens shutter mechanism including means responsive to said closed actuating switch to open said lens shutter, said means including means for timing the closing of said lens shutter after a selected time period of the opening of said lens shutter, and further including a switch electrically connected to be closed with said lens shutter open and to be open with said lens shutter closed, said switch maintaining the operation of said means for opening and closing to close said lens shutter mechanism with said actuating switch in an open or closed position.

2. Apparatus for controlling a camera focal plane shutter and a lens shutter as in claim 5, wherein said means for timing is a variable delay circuit having different selectable time delays and wherein said means for opening and closing said lens shutter mechanism further includes an electronic switching circuit for closing said lens shutter, said variable delay means is connected to said electronic switching circuit, a timing switch connected with said variable delay means, said timing switch is closed with said lens shutter closed and opened with the opening of said lens shutter to actuate said variable delay means to control the closing of said lens shutter in accordance with the selectable delay of said variable delay means.

3. An apparatus for controlling a camera focal plane shutter and a lens shutter as in claim 5 further comprising an electronic switching circuit for opening and closing said focal plane shutter, said additional circuit including a variable delay means having different selectable time delays and connected to said additional circuit, a safety switch connected with said variable delay means, said safety switch is closed with the opening of said lens shutter to prevent operation of said delay means and said safety switch is opened after said lens shutter is closed to operate said delay means to activate said additional circuit and close said focal plane shutter.

* * * * *

UNITED STATES PATENT OFFICE
CERTIFICATE OF CORRECTION

Patent No. 3,635,142  Dated January 18, 1972

Inventor(s) Takeshi Ataka, Shohei Tenkumo, Minoru Sekita, Yuji Nakaniwa

It is certified that error appears in the above-identified patent and that said Letters Patent are hereby corrected as shown below:

Claim 2:  Line 2, cancel "5" and insert --1--.

Claim 3:  Line 2, cancel "5" and insert --1--.

Signed and sealed this 5th day of September 1972.

(SEAL)
Attest:

EDWARD M. FLETCHER, JR.
Attesting Officer

ROBERT GOTTSCHALK
Commissioner of Patents